(12) United States Patent
Nikolaus et al.

(10) Patent No.: US 11,753,968 B2
(45) Date of Patent: Sep. 12, 2023

(54) NACELLE COWLING STRUCTURE FOR A TURBOMACHINE

(71) Applicant: Rolls-Royce Deutschland Ltd & Co KG, Blankenfelde-Mahlow (DE)

(72) Inventors: Roland Nikolaus, Berlin (DE); Michael Schacht, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 102 days.

(21) Appl. No.: 17/408,723

(22) Filed: Aug. 23, 2021

(65) Prior Publication Data
US 2023/0053784 A1     Feb. 23, 2023

(51) Int. Cl.
*B64D 29/08*  (2006.01)
*F02C 7/24*   (2006.01)
*F01D 25/26*  (2006.01)
*F01D 25/24*  (2006.01)

(52) U.S. Cl.
CPC .............. *F01D 25/26* (2013.01); *B64D 29/08* (2013.01); *F02C 7/24* (2013.01); *F01D 25/24* (2013.01); *F05D 2260/96* (2013.01)

(58) Field of Classification Search
CPC . B64D 29/08; F02C 7/24; F01D 25/24; F01D 25/26; F05D 2260/96
See application file for complete search history.

(56) References Cited

U.S. PATENT DOCUMENTS

| | | | | |
|---|---|---|---|---|
| 4,858,721 | A  * | 8/1989  | Autie   | F02K 1/827 181/224 |
| 7,090,165 | B2 * | 8/2006  | Jones   | F02C 7/00 244/54 |
| 7,540,354 | B2 * | 6/2009  | Morin   | F02K 1/827 428/116 |
| 8,136,362 | B2 * | 3/2012  | Beutin  | F01D 25/24 244/54 |
| 8,931,588 | B2 * | 1/2015  | Murray  | F02K 3/06 181/292 |
| 9,631,578 | B2   | 4/2017  | Suciu et al. | |
| 9,732,677 | B1 * | 8/2017  | Chien   | G10K 11/172 |
| 9,797,271 | B2 * | 10/2017 | Brown   | F01D 25/26 |
| 9,919,500 | B2   | 3/2018  | Vrljes et al. | |
| 10,641,287 | B2  | 5/2020  | Kappes et al. | |
| 10,961,913 | B2 * | 3/2021  | Howarth | F02K 1/827 |

(Continued)

OTHER PUBLICATIONS

Howard, Courtney E.; GE Aviation Debuts Affinity, Fist Civil Supersonic Engine in 55 Years; Oct. 29, 2018.

*Primary Examiner* — Brian P Wolcott
(74) *Attorney, Agent, or Firm* — SHUTTLEWORTH & INGERSOLL, PLC; Tomthy Klima

(57) ABSTRACT

Embodiments of the invention are shown in the figures, where a nacelle cowling structure for a turbomachine having a bypass duct defining a path for an airflow is provided, the nacelle cowling structure including: an outer layer defining an external surface of the nacelle cowling structure, an inner layer defining a surface of the bypass duct, a front mounting area for fixation to the turbomachine and a rear mounting area for fixation to the turbomachine downstream the front mounting area with respect to the bypass duct flow path, wherein a space between the outer and inner layers and between the front and rear mounting areas is filled with acoustic material.

20 Claims, 5 Drawing Sheets

(56) References Cited

U.S. PATENT DOCUMENTS

| | | | |
|---|---|---|---|
| 11,325,718 B2* | 5/2022 | Berry | G10K 11/168 |
| 2002/0006078 A1 | 1/2002 | Battini et al. | |
| 2010/0024161 A1* | 2/2010 | Wood | E05C 17/30 |
| | | | 16/82 |
| 2011/0133025 A1* | 6/2011 | Vauchel | F02C 7/045 |
| | | | 244/1 N |
| 2013/0075193 A1 | 3/2013 | Vavalle | |
| 2019/0219000 A1* | 7/2019 | Reed | F02K 1/827 |
| 2020/0095938 A1* | 3/2020 | Cheung | F02C 7/24 |
| 2022/0349347 A1* | 11/2022 | Wong | F02C 7/20 |

* cited by examiner

NACELLE COWLING STRUCTURE FOR A TURBOMACHINE

BACKGROUND

This disclosure relates to a nacelle cowling structure for a turbomachine, and to a turbomachine.

Turbomachines having a bypass duct generally comprise a nacelle that surrounds an engine core. A typical challenge in the area of turbomachines is to improve the efficiency of the turbomachine, e.g., by reducing the aerodynamic drag of the turbomachine. This is particularly relevant for supersonic applications.

SUMMARY

It is an object to allow an improved efficiency of turbomachines.

The object is achieved by a nacelle cowling structure having features as described herein.

According to an aspect, a nacelle cowling structure for a turbomachine is described, the turbomachine having a bypass duct defining a path for an airflow, the nacelle cowling structure comprising an outer layer defining an external surface of the nacelle cowling structure, an inner layer defining a surface of the bypass duct, a front mounting area for fixation to the turbomachine and a rear mounting area for fixation to the turbomachine downstream the front mounting area with respect to the bypass duct flow path, wherein a space between the outer and inner layers and between the front and rear mounting areas is filled with acoustic material.

Such a nacelle cowling structure allows that a gas path of a bypass flow system and an outer nacelle line come particularly close to one another. In turn, this construction allows particularly slim nacelle aero lines. Thereby, the weight and the aerodynamic drag of the turbomachine can be reduced. This allows an increased efficiency of the machine.

The nacelle cowling structure may comprise some or all of the features described in the following.

Optionally, the nacelle cowling structure further has at least one access opening extending through the outer layer, acoustic material, and inner layer. Such an opening may provide access to the bypass duct and/or turbomachine core in a convenient manner.

The nacelle cowling structure may further comprise at least one door closing the access opening in a closed state. The door may have an opened state and may provide access to the bypass duct in the opened state. The door may be movable between the closed and opened states. This allows convenient access.

The door may have an outer layer defining a part of the external surface of the nacelle cowling structure. The door may have an inner layer defining a part of the surface of the bypass duct. The door may comprise acoustic material in between the outer and inner layers. Thus, the door can be a part of the nacelle cowling, what can simplify the construction.

Optionally, the door is connected to the nacelle cowling structure (e.g., to the inner layer thereof) by means of at least one hinge. This allows to easily open and close the door. Alternatively, or in addition, the door can be fixed in the closed state by means of screws and/or one or more or latches. This allows a particularly secure closure of the door.

Optionally, the inner layer comprises the front and/or rear mounting area(s). Optionally, the nacelle cowling structure is not connected to the turbomachine core between the front and rear mounting areas.

The outer layer (of the nacelle cowling structure and/or of the door(s) thereof) may comprise a carbon composite material, e.g., a carbon fiber composite material such as a carbon-fiber-reinforced polymer. This allows a high stiffness, low weight to strength ratio, high temperature tolerance and low thermal expansion. The inner layer may comprise a (e.g., carbon fiber) composite material and/or a metal (e.g., for higher speeds and temperatures). According to an example, the acoustic material comprises a honeycomb structure. This allows a lightweight solution. In addition, the acoustic material may contribute to the stiffness of the nacelle cowling structure. A honeycomb structure allows a particularly good stiffness-to-weight ratio.

The outer layer may be mounted on the inner layer. The inner layer may carry the outer layer and/or the acoustic material. Thus, the inner layer may serve as main load-carrying structure of the nacelle cowling structure. Alternatively, the nacelle cowling structure comprises an inner part comprising the inner layer and a backskin (between the inner and outer layers), wherein the backskin of the inner part carries the inner and/or outer layers and/or the acoustic material. In that case, the backskin of the inner part may serve as main load-carrying structure of the nacelle cowling structure.

One or each of the front and rear mounting areas may comprise a flange. This allows a strong and reliable connection to other parts of the turbomachine. Further, particularly a flange allows a connection to an exhaust system. The nacelle cowling structure may thus provide interfaces, carry loads of connected parts (such as the exhaust system) and provide stiffness.

The acoustic material may be a sound absorber. Therefore, noise created by the turbomachine may be effectively attenuated.

The nacelle cowling structure may have a cylindrical shape, particularly a circular-cylindrical shape. For example, the outer circumference of the nacelle cowling structure is cylindrical, particularly circular-cylindrical. Alternatively, the nacelle cowling structure has a curved outer shape.

The nacelle cowling structure may surround an area for housing a core of the turbomachine. The turbomachine core may comprise combustion equipment. For example, the turbomachine is a gas turbine engine, e.g., for an aircraft.

According to an aspect, a nacelle cowling structure for a turbomachine is provided, the turbomachine having a bypass duct defining a path for an airflow, the nacelle cowling structure comprising an outer layer defining an external surface of the nacelle cowling structure, an inner layer defining a surface of the bypass duct, wherein an acoustic material is arranged in a space between the outer and inner layers, the nacelle cowling structure further having an access opening extending through the outer layer, acoustic material, and inner layer. The nacelle cowling structure of this aspect may comprise any, or all, of the features described above or below.

The front mounting area of the nacelle cowling structure of any aspect or embodiment described herein may be fixed to a case of the turbomachine and/or the rear mounting area may be fixed to a turbomachine core of the turbomachine.

According to an aspect, a turbomachine is provided, the turbomachine having a bypass duct defining a path for an airflow, a nacelle cowling structure and a turbomachine core fixed to the nacelle cowling structure, the nacelle cowling structure comprising an outer layer defining an external surface of the nacelle cowling structure, an inner layer defining a surface of the bypass duct, a front mounting area fixed to a case of the turbomachine and a rear mounting area (directly or indirectly, e.g., via a rear mount ring and struts) fixed to the turbomachine core downstream the front mounting area with respect to the bypass duct flow path, wherein a space between the outer and inner layers and between the front and rear mounting areas is filled with acoustic material.

The turbomachine may comprise some or all of the features described in the following, and the nacelle cowling structure of the turbomachine may comprise any, or all, of the features described above.

Particularly, the turbomachine may further comprise a fan and/or a compressor that directs an airflow through the bypass duct and/or the turbomachine core. The bypass duct may surround the turbomachine core. For example, the bypass duct may be annular and/or curved.

According to an embodiment, the turbomachine is an aircraft engine, for example, for a supersonic aircraft. The turbomachine core may comprise a gas turbine engine. The gas turbine engine may comprise combustion equipment for combustion of fuel.

Optionally, the front mounting area is fixed to the case of the turbomachine (e.g., an intermediate case) by means of a bolted connection and/or flanges. Alternatively or in addition, the rear mounting area is fixed to the turbomachine core by means of a bolted connection and/or flanges.

The nacelle cowling structure may provide a mechanical connection to an exhaust system. Thus, it may be mechanically connected to the exhaust system. The nacelle cowling structure may provide an interface, mechanical support, and stiffness.

For example, the exhaust system comprises a fixed nozzle, a thrust reverser, a variable exhaust nozzle or an afterburner, or any combination thereof.

According to an aspect, a nacelle cowling structure for a turbomachine is provided, the turbomachine having a bypass duct defining a path for an airflow, the nacelle cowling structure comprising an outer part comprising or being formed by an outer layer defining an external surface of the nacelle cowling structure, an inner part comprising an inner layer defining a surface of the bypass duct, an acoustic material and a load-carrying backskin, a front mounting area for fixation to the turbomachine and a rear mounting area for fixation to the turbomachine downstream the front mounting area with respect to the bypass duct flow path, wherein a space is formed between the outer and inner layers, and wherein the outer and inner parts are connected with one another between the front and rear mounting areas by means of bulkheads and ribs. The nacelle cowling structure of this aspect may comprise any, or all, of the features described above or below.

BRIEF DESCRIPTION OF THE DRAWINGS

The solution will be explained in conjunction with the embodiments illustrated in the figures.

DETAILED DESCRIPTION

Figure 1:
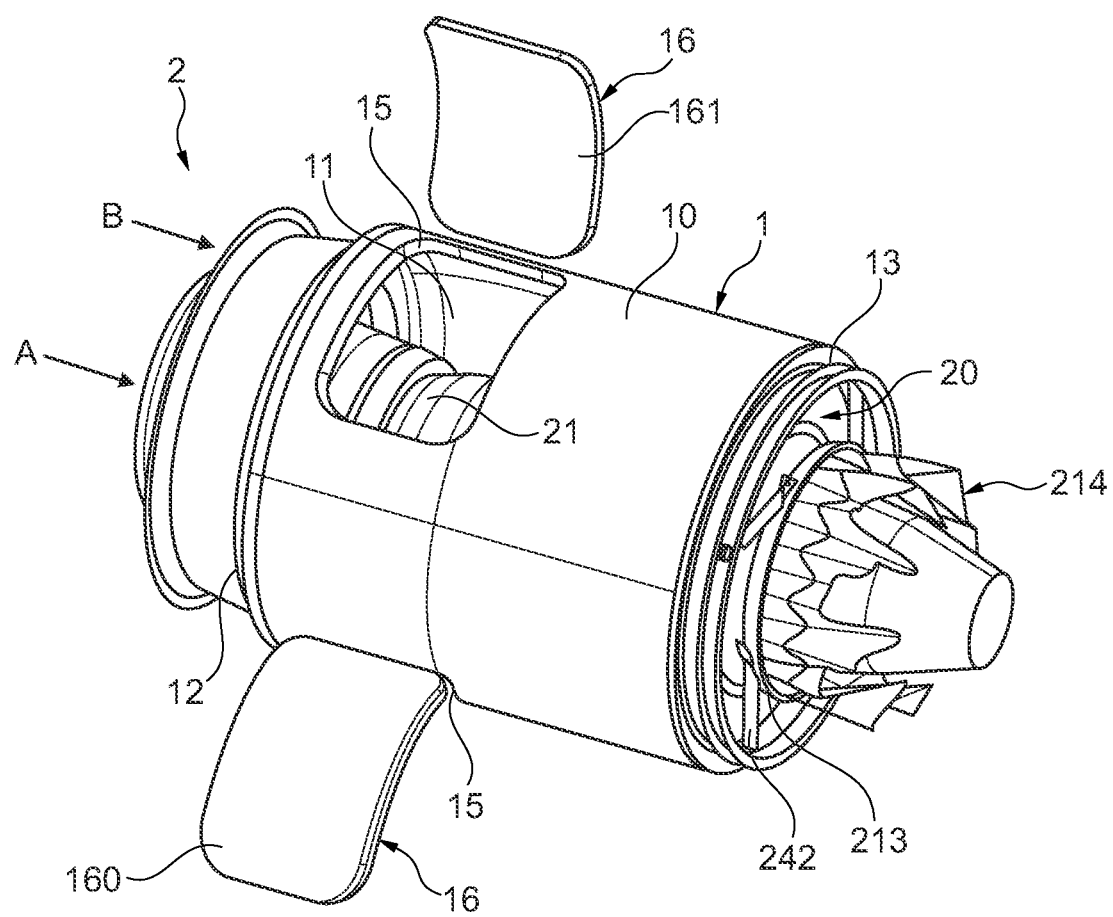
FIG. 1 shows a perspective view of a turbomachine being an aircraft engine and having a nacelle cowling structure, wherein doors of access openings are opened.
Figure 2:
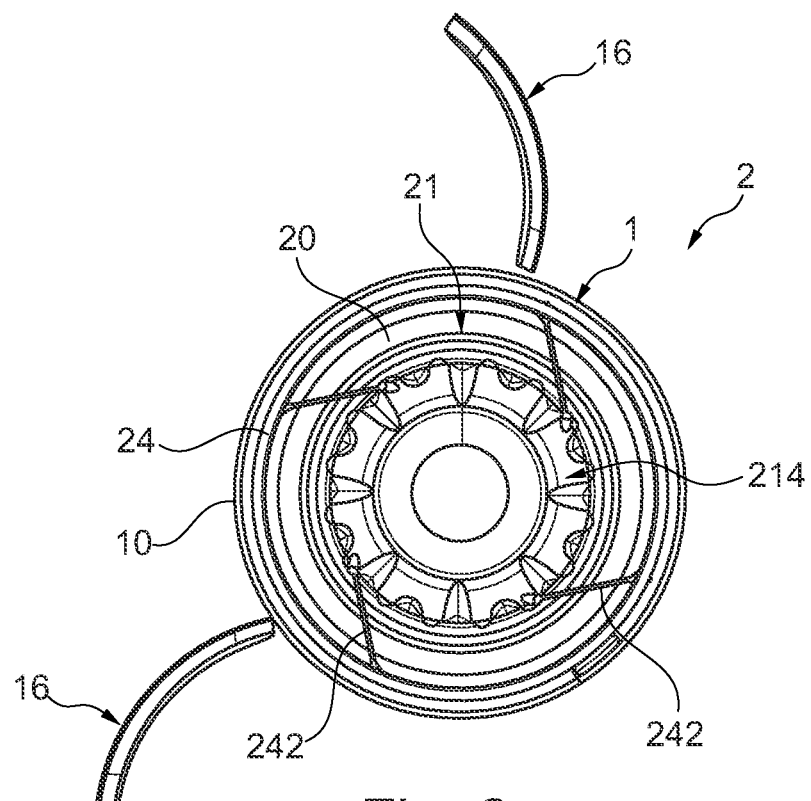
FIG. 2 shows a rear view of the turbomachine.

FIGS. 1-5 illustrate a turbomachine 2 in the form of a gas turbine engine of an aircraft, having a principal rotational axis R. The turbomachine 2 comprises an air intake and a propulsive fan 22 that generates two airflows: a core airflow A and a bypass airflow B. The turbomachine 2 comprises a core 21 that receives the core airflow A. The engine core 21 comprises, in axial flow series, a compressor 210 (that may have one or more stages), combustion equipment 211, a turbine 212 (that may have one or more stages) and a core exhaust nozzle 214. The turbomachine 2 is a turbofan engine.

A nacelle cowling structure 1 surrounds the core 21 of the turbomachine 2 and defines a bypass duct 20. A bypass exhaust nozzle 25 is mounted at a rear end of the nacelle cowling structure 1. The bypass airflow B flows through the bypass duct 20. The fan 22 is attached to and driven by the turbine 212 via a shaft. The bypass duct 20 is annular and surrounds the core 21. The bypass duct 20 defines a path for the bypass airflow B.

In use, the core airflow A is accelerated and compressed by the compressor 210. The compressed air exhausted from the compressor 210 is directed into the combustion equipment 211 where it is mixed with fuel and the mixture is combusted. The resultant hot combustion products then expand through, and thereby drive, the turbine 212 before being exhausted through the core exhaust nozzle 214 to provide some propulsive thrust. The fan 22 generally provides the majority of the propulsive thrust.

The nacelle cowling structure 1 comprises an outer part in the form of an outer layer 10, an inner part having an inner layer 11, a front mounting area 12, a rear mounting area 13 and acoustic material 14. The nacelle cowling structure 1 is (in particular, completely) arranged downstream the fan 22.

The outer layer 10 defines an external surface of the nacelle cowling structure 1 and, thus, an external surface of the entire gas turbine engine. The outer layer 10 is an outer skin. In use, air outside the nacelle cowling structure 1 which does not enter the core airflow A or the bypass airflow A flows over the external surface of the outer layer 10. The outer layer 10 is made of a (thin) sheet of material (the material can be a metal, a monolithic composite with ribs and stringers or a sandwich construction). In the example shown in the figures, the outer layer 10 has a (hollow) circular cylindrical form. The outer layer 10 is made of a carbon fiber composite. The outer layer 10 is designed to tolerate hail stone impacts as well as aerodynamic and maintenance loads.

The inner layer 11 defines an inner surface that forms an outer boundary of the bypass duct 20. An inner boundary of the bypass duct 20 is formed by an outer surface of the core 21. The inner layer 11 is made of a sheet of material. For example, the inner layer is made of metal, e.g., of steel. The inner layer 11 may be formed in one piece. The inner layer 11 extends around the core 21. The inner layer 11 is surrounded by the outer layer 10.

The inner part carries the outer part. In this example, the inner layer 11 carries the outer layer 10 and the acoustic material 14. The inner layer 11 is an inner shell. The inner layer 11 carries the majority of the loads applied on the nacelle cowling structure 1. The inner layer 10 can, thus, also be described as structural inner part. In the present example, the inner layer 10 is formed as an integral part.

The material of the inner layer 11 also forms the front mounting area 12 and the rear mounting area 13.

The front mounting area 12 is for fixation to the turbomachine 2 structure. The front mounting area 12 is located at the front end of the nacelle cowling structure 1. The front mounting area 12 comprises a flange 120. The flange 120 is oriented upstream. The flange 120 of the front mounting area 12 is in contact to and fixedly connected to another part of the turbomachine 2, here, an intermediate case 23. In the present example, this connection is made by means of bolts. With respect to the core and bypass airflows A, B, the intermediate case 23 is arranged upstream and in between the nacelle cowling structure 1 and the fan 22. The fan 22 may be surrounded by a fan case which can be connected to the nacelle cowling structure 1 by means of the intermediate case 23. The intermediate case 23 comprises a flange 230. The flange 230 of the intermediate case 23 is in contact to and fixed to the flange 120 of the front mounting area 12.

The rear mounting area 13 is located downstream the front mounting area 12 with respect to the core and bypass airflows A, B. The rear mounting area 13 comprises a flange 130. The flange 130 is oriented downstream. The flange 130 is oriented towards the exhaust. The flange 130 of the rear mounting area 13 is in contact to and fixedly connected to another part of the turbomachine 2, here, a rear mount ring 24. In the present example, this connection is made by means of bolts. Alternatively, the nacelle cowling structure 1 and the rear mount ring 24 may be an integral part.

The rear mounting area 13 is for fixation to the turbomachine 2 structure. The rear mounting area 13 is located at the rear end of the nacelle cowling structure 1. The rear mount ring 24 comprises a flange 240 that is in contact to and fixed to the flange 130 of the rear mounting area 13. Further, the rear mount ring 24 comprises another flange 241 facing away the nacelle cowling structure 1. This other flange 241 is fixed to a flange 250 of a bypass exhaust nozzle 25.

The rear mount ring 24 is connected to the core 21 of the turbomachine 2 by means of a plurality of connecting elements. In the present example, the connecting elements are formed as struts 242. As can be seen, e.g., in FIGS. 1-3, the turbomachine 2 comprises four struts 242. Each strut 242 extends away from the core 21 tangentially. This allows a particularly lightweight attachment of the core 21 to the nacelle cowling structure 1. Thus, the core 21 is suspended on, and carried by, the nacelle cowling structure 1. At the other end of the nacelle cowling structure 1, the nacelle cowling structure 1 is fixed to the core 21 by means of the intermediate case 23 and the fan case.

Thus, the nacelle cowling structure 1 is fixed to the core 21 by means of the front mounting area 12 and by means of the rear mounting area 13. Alternatively, there may be no struts 242, but rather a single-point mechanical connection from the nacelle cowling structure 1 and/or rear mount ring 24 to the core 21 engine.

As an alternative to mounting the rear mounting area 13 to the rear mount ring 24, the rear mount area 13 may be directly mounted to the exhaust module of the core 21. The rear mount ring 24 may be integral with the inner layer 11. In that case, the integral rear mount ring may be the rear mounting area.

The integral nacelle cowling structure 1 thus at least partially forms the structural bypass duct 20. In other words, the structural bypass duct 20 is merged with the outer fixed nacelle cowling structure 1.

Figure 4:
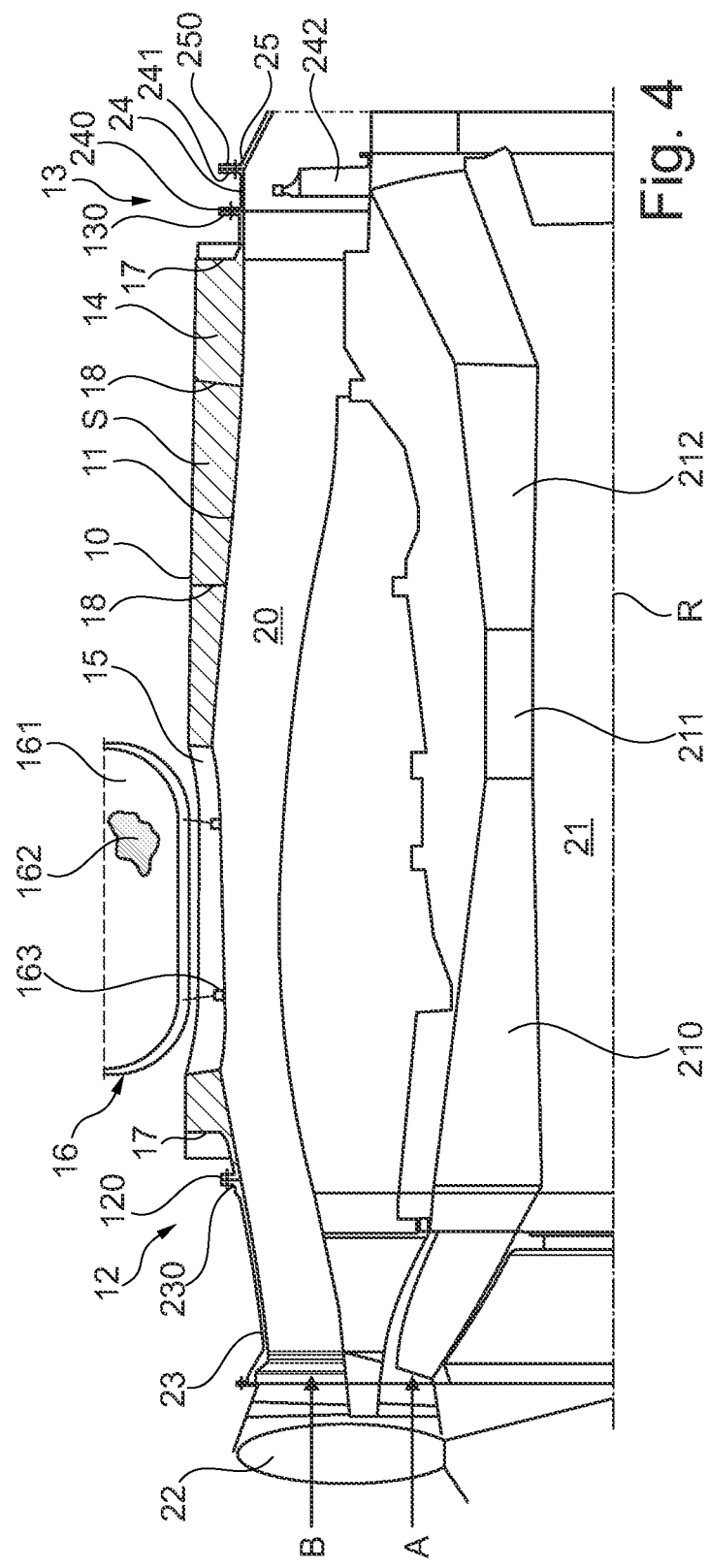
FIG. 4 shows a sectional side view of the turbomachine with the nacelle cowling structure.
Figure 5:
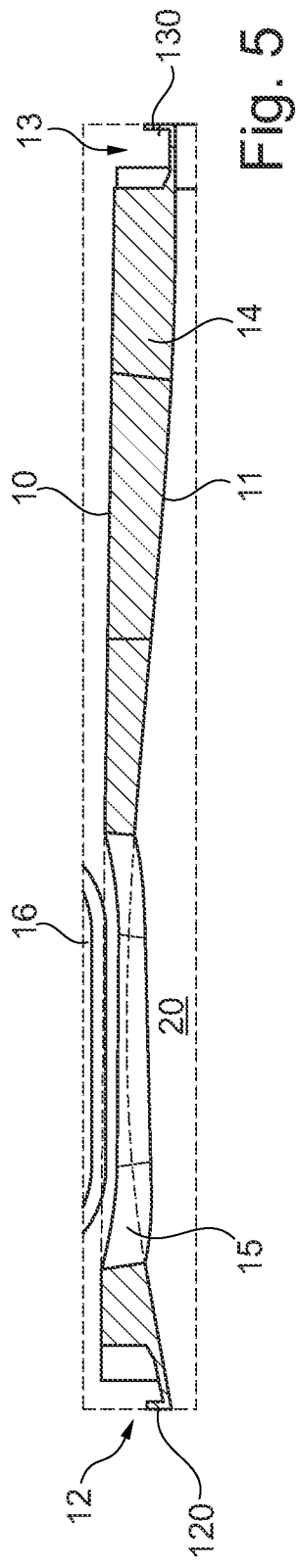
FIG. 5 shows a close-up sectional side view of the nacelle cowling structure.

As can be seen, e.g., in FIGS. 4 and 5, a space S is formed between the outer layer 10 and the inner layer 11. This space S is annular. The space S between the outer and inner layers 10, 11 (and between the front and rear mounting areas 12, 13) is filled, e.g., completely or substantially completely, filled with the acoustic material 14. Alternatively, the inner layer 11 carries the acoustic material 14 and the space S is at least partially open and/or not filled with acoustic material. The outer and inner parts, here the outer and inner layers 10, 11, are connected by means of bulkheads 17 at front and rear, ribs 18 in between, and, optionally, longitudinal skins.

Further, the turbomachine 2 engine may be partially embedded into the aircraft. Therefore, not the entire circumferential perimeter of the turbomachine 2 may need the outer part. So, part of the circumference may only have the inner part. Particularly in this case the outer and inner layers 10, 11 may comprise one or more longitudinal skins (e.g., stringers).

Figure 6:
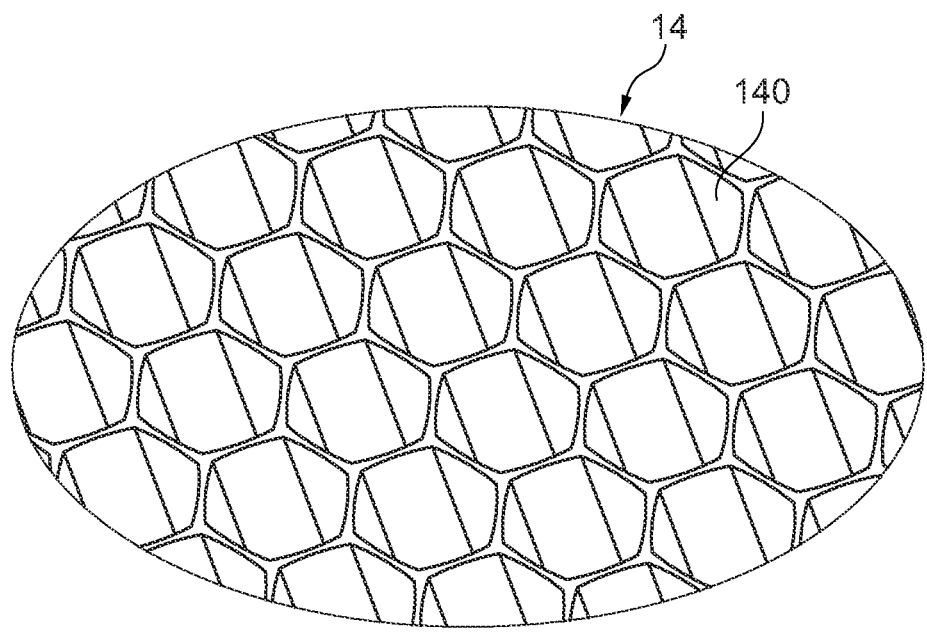
FIG. 6 shows a view of an acoustic material of the nacelle cowling structure.

As shown in FIG. 6, the acoustic material 14 is an acoustic noise absorber. The acoustic material 14 comprises a honeycomb structure 140. This allows an efficient sound attenuation and high structural stiffness with a low weight.

As illustrated in FIGS. 4 and 5, the nacelle cowling structure 1 comprises frames, beams, brackets and/or the like to support the outer layer 10. For this purpose, the inner layer 11 provides mounting connections which are connected with the frames, beams, brackets etc. to support the outer layer 10.

Further, the nacelle cowling structure 1 comprises one or more access openings 15, in the present example two access openings 15. Each of the access openings 15 extends through the outer layer 10, acoustic material 14 layer and inner layer 11. The access openings 15 are cutouts in the nacelle cowling structure 1. Thus, the bypass duct 20 is accessible via the access openings 15. Therefore, the core of the turbomachine 2 is accessible via the access openings 15.

In the direction of the rotational axis R and the core and bypass airflows A, B, the access openings 15 extend over a substantial portion of the length of the nacelle cowling structure 1, e.g., between a quarter and half of the length. Both access openings 15 are arranged at the same axial position of the nacelle cowling structure 1. Both access openings 15 have the same shape and size. The access openings 15 are arranged spaced apart from one another in the circumferential direction.

As can be seen, e.g., in FIGS. 4 and 5, in a cross section along the rotational axis R, the outer layer 10 extends along a straight line, while the inner layer 11 extends along a curved line (see dotted lines in FIG. 5). At the front and rear mounting areas 12, 13, the distance between the outer and inner layers 10, 11 is larger than between the front and rear mounting areas 12, 13. The access openings 15 are arranged at the location where the distance between the outer and inner layers 10, 11 is minimal.

Each access openings 15 is provided with a door 16. Each of the doors 16 has a form that matches the form of the respective access opening 15.

The access opening 15 doors 16 are constructed in correspondence with the surrounding portions of the nacelle cowling structure 1. Thus, each door 16 comprises an outer layer 160 and an inner layer 161 spaced apart from one another so as to form a space therebetween. Further, acoustic material 162 (e.g., the same type as the acoustic material 14)

is arranged in the space between the outer and inner layers 160, 161, see the partially cut-away view of FIG. 4.

Figure 3:
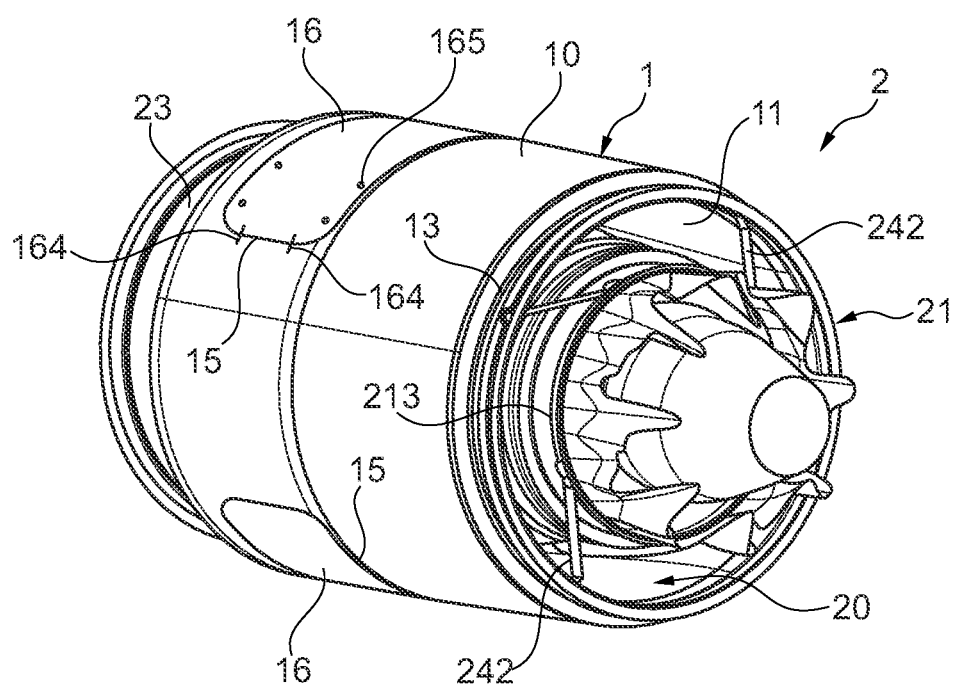
FIG. 3 shows a perspective view of the turbomachine, wherein the doors of the access openings are closed.

Each door 16 is pivotably connected to the adjacent portion of the nacelle cowling structure 1. As an example, each of the doors 16 is connected or connectable to the adjacent portion of the nacelle cowling structure 1 by means of a hinge 163, see FIG. 4, and/or by means of one or more latches 164 and/or by means of screws 165 (e.g., as depicted in FIG. 3). The nacelle cowling structure 1 provides an interface and/or V-groove(s) for the hinged doors 16. The doors 16 may serve as cowl doors.

The doors 16 can be opened to provide access to the bypass duct 20 and core 21 for maintenance and closed in use. Alternatively, or in addition, each door 16 is latched and/or bolted to the adjacent portions of the nacelle cowling structure 1.

The doors 16 provide a flush and sealed closure of the access openings 15. In their closed state, the doors 16 define a portion of the bypass duct 20, and a portion of the external aerodynamic surface of the nacelle cowling structure 1.

It is worth noting that the described nacelle cowling structure 1 allows a minimized radial design space utilization for a low nacelle drag for either subsonic or supersonic engine installations, e.g., podded or semi-embedded engine installations on an airplane. Further, the nacelle cowling structure 1 is less exposed to fire zone and burst duct zone boundaries. This further allows a reduction of the weight.

The nacelle cowling structure 1 is an assembly comprising the inner part which defines the bypass duct 20, the bulkheads 17, rib(s) 18 (and/or walls 19) and the outer part (and the acoustic material 14). The nacelle cowling structure 1 is pre-mounted for assembly with other parts of the turbomachine 2 and/or on the aircraft.

Figure 7:
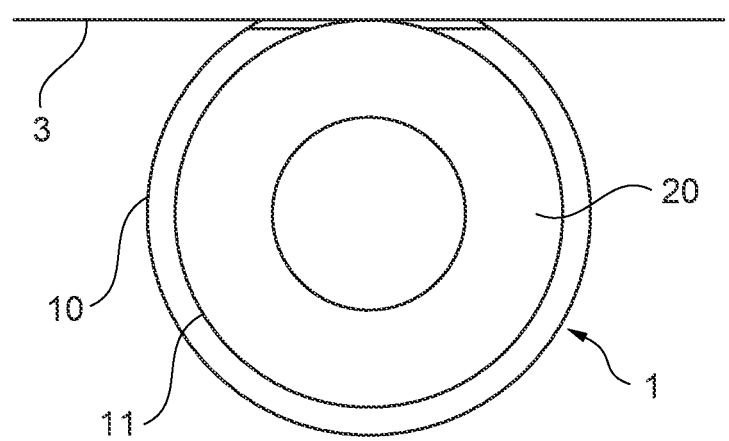
FIG. 7 shows an aircraft with a nacelle cowling structure.

FIG. 7 shows the aircraft 3 with a turbomachine engine with a bypass duct 20 and a nacelle cowling structure 1 constructed as described above but partially embedded into an outer wall of the aircraft 3.

Figure 8:
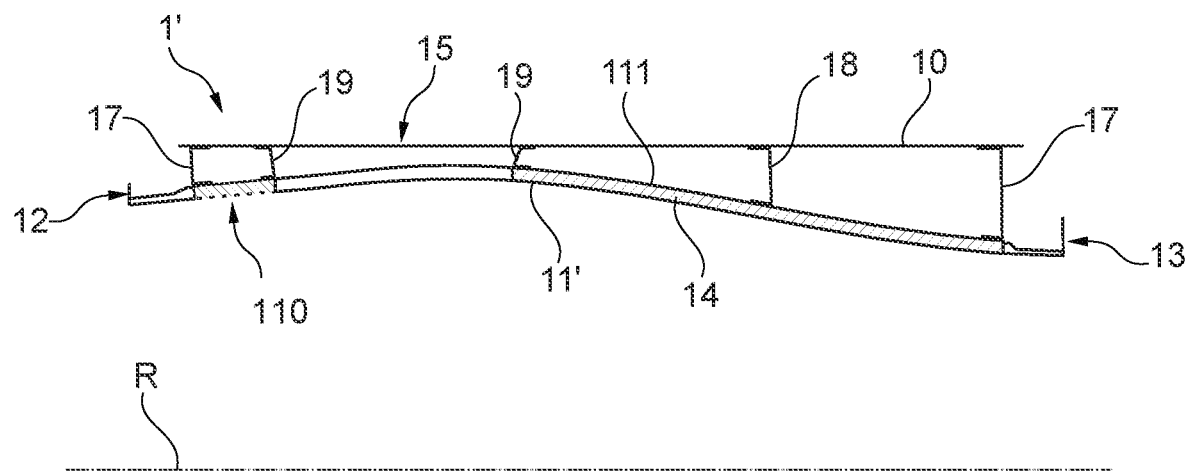
FIG. 8 shows a sectional side view of a nacelle cowling structure.

FIG. 8 shows a nacelle cowling structure 1' similar to the nacelle cowling structure 1 described above. Specifically, the nacelle cowling structure 1' has an inner part which comprises an inner layer 11', a backskin 111 and the acoustic material 14 between the inner layer 11' and the backskin 111. Between the outer layer 10 and the backskin 111 of the inner part there is an inner space which is empty but can optionally be filled with acoustic material. The outer layer 10 may be a monolithic skin. The outer layer 10 may carry at least a part of the loads applied on the nacelle cowling structure 1'. Optionally, the outer layer 10 comprises axial stringers.

The inner layer 11' has a perforation 110 in a front region. Optionally, the perforation 110 extends over the entire inner layer 11' over its length (along the rotational axis R). The perforation 110 may further improve the acoustic attenuation.

The outer layer 10 and the backskin 111 of the inner part are fixed to one another by means of the front and rear bulkheads 17, by one or more ribs 18 between the front and rear bulkheads 17 and by a wall 19 defining the access opening 15. The backskin 111 of the inner part carries the outer layer 10. The backskin 111 and inner layer 11' are fixedly connected to the front and rear mounting areas 12, 13. The bulkheads 17 and/or the rib(s) 18 and/or the wall 19 may be integrally formed with the outer layer 10, e.g., formed in one piece and of the same material.

Figure 9:
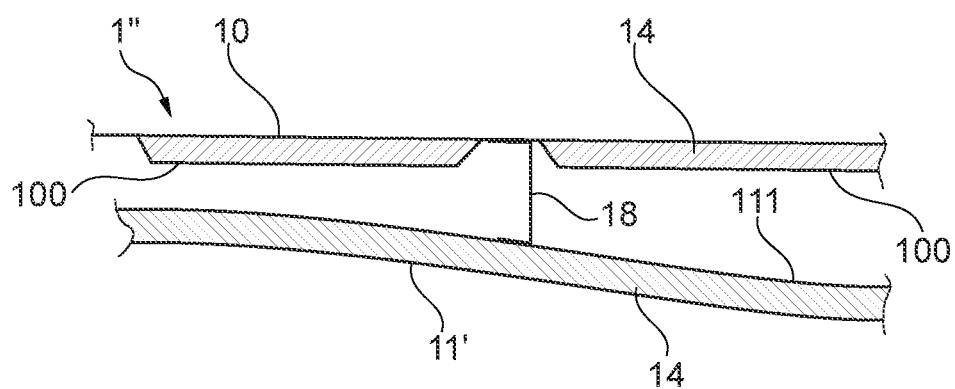
FIG. 9 shows a close-up sectional side view of a nacelle cowling structure.

FIG. 9 shows a nacelle cowling structure 1'' similar to the nacelle cowling structure 1' described above with reference to FIG. 8. According to FIG. 9, the outer part comprises at least one backskin 100 (in this example several backskins 100) which are mounted on the outer layer 10 at an inner side thereof. Between the outer layer 10 and the backskin(s) 100 a space is formed which is filled with acoustic material 14, e.g., the same acoustic material 14 as described above. Alternatively, a foam may be provided therein.

Hence, the outer part and/or the inner part may have a sandwich construction.

The invention claimed is:

1. A nacelle cowling structure for a turbomachine having a bypass duct defining a flow path for an airflow, the nacelle cowling structure comprising:
    an outer layer defining an external surface of the nacelle cowling structure,
    an inner layer defining a surface of the bypass duct,
    an acoustic material and a load-carrying backskin,
    a front mounting area for fixation to the turbomachine and a rear mounting area for fixation to the turbomachine downstream of the front mounting area with respect to the bypass duct flow path,
    wherein a space between the outer and inner layers and between the front and rear mounting areas is filled with the acoustic material,
    bulkheads and ribs connecting the outer layer and inner layer with one another between the front and rear mounting areas.

2. The nacelle cowling structure according to claim 1, and further comprising an access opening extending through the outer layer, acoustic material, and inner layer.

3. The nacelle cowling structure according to claim 2, and further comprising a door closing the access opening in a closed state and providing access to the bypass duct in an opened state.

4. The nacelle cowling structure according to claim 3, the door comprising a portion of the an outer layer and a portion of the inner layer, and a portion of the acoustic material in between.

5. The nacelle cowling structure according to claim 3, and further comprising a hinge and latch connecting the door to the nacelle cowling structure inner layer.

6. The nacelle cowling structure according to claim 1, wherein the inner layer comprises the front and rear mounting areas.

7. The nacelle cowling structure according to claim 1, wherein the outer layer comprises a carbon composite material, the inner layer comprises at least one chosen from a composite material and a metal, and the acoustic material comprises a honeycomb structure.

8. The nacelle cowling structure according to claim 1, wherein the outer layer is mounted on the inner layer, and the inner layer carries the outer layer.

9. The nacelle cowling structure according to claim 1, wherein each of the front and rear mounting areas comprises a flange.

10. The nacelle cowling structure according to claim 1, wherein the acoustic material is a sound absorber.

11. The nacelle cowling structure according to claim 1, having a cylindrical or curved shape.

12. The nacelle cowling structure according to claim 1, surrounding an area for housing a core of the turbomachine, the core comprising combustion equipment.

13. A nacelle cowling structure for a turbomachine having a bypass duct defining a flow path for an airflow, the nacelle cowling structure comprising:
    an outer layer defining an external surface of the nacelle cowling structure,
    an inner layer defining a surface of the bypass duct,
    an acoustic material and a load-carrying backskin, wherein the acoustic material is arranged in a space between the outer and inner layers, the nacelle cowling structure further comprising an access opening extending through the outer layer, acoustic material, and inner layer, a front mounting area for fixation to the turbomachine and a rear mounting area for fixation to the turbomachine downstream of the front mounting area with respect to the bypass duct flow path, bulkheads and ribs connecting the outer layer and inner layer with one another between the front and rear mounting areas.

14. The nacelle cowling structure of claim 1, wherein the front mounting area is fixed to a case of the turbomachine and the rear mounting area is fixed to a turbomachine core of the turbomachine.

15. The nacelle cowling structure according to claim 14, wherein a fan directs an airflow through the bypass duct and the turbomachine core, wherein the bypass duct surrounds the turbomachine core.

16. The nacelle cowling structure according to claim 14, wherein the turbomachine is an aircraft engine and the turbomachine core comprises a gas turbine engine.

17. The nacelle cowling structure according to claim 14, wherein the front mounting area is fixed to the case by a bolted connection and the rear mounting area is fixed to the turbomachine core by a bolted connection.

18. The nacelle cowling structure according to claim 14, providing a mechanical connection to an exhaust system.

19. The nacelle cowling structure according to claim 18, wherein the exhaust system comprises at least one chosen from a fixed nozzle, a thrust reverser, a variable exhaust nozzle and an afterburner.

20. A nacelle cowling structure for a turbomachine having a bypass duct defining a flow path for an airflow, the nacelle cowling structure comprising:

an outer part comprising or being formed by an outer layer defining an external surface of the nacelle cowling structure, an inner part comprising an inner layer defining a surface of the bypass duct, an acoustic material and a load-carrying backskin, a front mounting area for fixation to the turbomachine and a rear mounting area for fixation to the turbomachine downstream of the front mounting area with respect to the bypass duct flow path, wherein a space is formed between the outer and inner layers, and bulkheads and ribs connecting the outer and inner parts with one another between the front and rear mounting areas.

* * * * *